United States Patent [19]

Jaki et al.

[11] Patent Number: 4,942,856
[45] Date of Patent: Jul. 24, 1990

[54] IGNITION DISTRIBUTOR FOR AN INTERNAL COMBUSTION ENGINE

[75] Inventors: Friedrich Jaki, Erdmannhausen; Hartmut Brammer, Vaihingen/Enz., both of Fed. Rep. of Germany

[73] Assignee: Robert Bosch GmbH, Stuttgart, Fed. Rep. of Germany

[21] Appl. No.: 377,391

[22] Filed: Jul. 10, 1989

[30] Foreign Application Priority Data

Sep. 10, 1988 [DE] Fed. Rep. of Germany ....... 3830900

[51] Int. Cl.$^5$ .............................................. F02P 7/02
[52] U.S. Cl. .................. 123/146.5 A; 200/19 R; 464/8; 464/92
[58] Field of Search ............ 123/146.5 A; 200/19 R; 403/287, 301, 336; 464/7, 8, 87, 92, 112, 147, 149

[56] References Cited

U.S. PATENT DOCUMENTS

| 1,488,497 | 4/1924 | Higgins ................................ 464/7 |
| 4,185,600 | 1/1980 | Brammer et al. ............ 123/146.5 A |
| 4,530,674 | 7/1985 | Rauch ................................ 464/147 |

FOREIGN PATENT DOCUMENTS

| 2930134 | 2/1981 | Fed. Rep. of Germany . |
| 533672 | 2/1941 | United Kingdom ............ 200/19 R |
| 1589088 | 5/1988 | United Kingdom . |

Primary Examiner—Tony M. Argenbright
Assistant Examiner—Robert E. Mates
Attorney, Agent, or Firm—Edwin E. Greigg

[57] ABSTRACT

An ignition distributor which is driven by an engine includes a structural division between the engine block and ignition distributor and has a separable connection, which is embodied as a claw coupling. For corresponding operational parts dimensionally stable, self-lubricating and wear-resistant plastic is used at the force transfer points of the claw coupling. Thus, it is possible to operate the claw coupling in a dry-running manner which does not require an encapsulated lubrication.

20 Claims, 2 Drawing Sheets

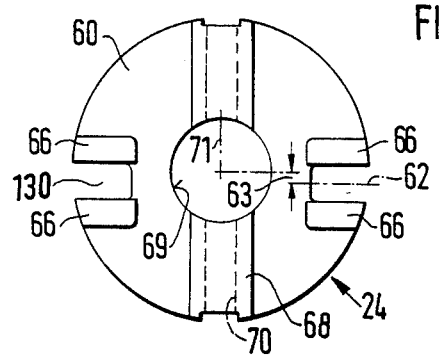# 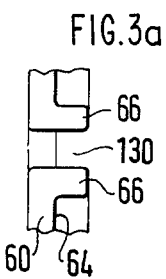
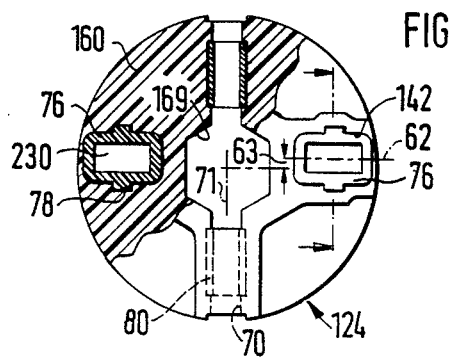# 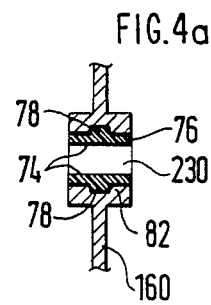
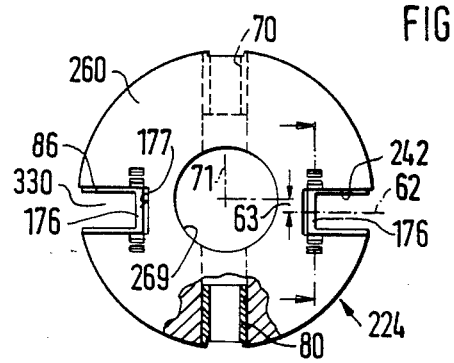# 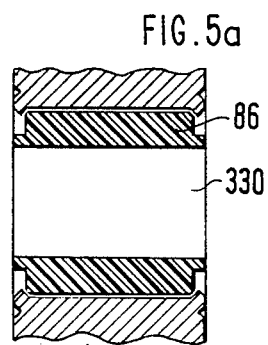

4,942,856

IGNITION DISTRIBUTOR FOR AN INTERNAL COMBUSTION ENGINE

BACKGROUND OF THE INVENTION

The invention is based on an ignition distributor as defined hereinafter. An ignition distributor is already known from German Offenlegungsschrift No. 29 30 134, in which coupling of the distributor shaft to the drive device is effected via a claw coupling. The coupling parts are typically made of steel. This means that the coupling parts must be surrounded with motor oil to prevent dry running and reduce wear and the attendant change in the ignition timing. German Offenlegungsschrift No. 26 36 651 also discloses an ignition distributor in which the coupling parts embodied on the drive device and the distributor shaft are connected by means of a slaving device that couples these parts together. This slaving device is typically of elastic material. Because of its resilience, the angle of twist occurring in the slaving device in response to a rotational strain impairs the constancy of the ignition timing. Because the claw coupling is in three parts, the length of the coupling is relatively large in proportion to the rest of the ignition distributor, and the engineering expense is increased substantially when compared with the conventional version initially referred to above.

OBJECT AND SUMMARY OF THE INVENTION

The ignition distributor defined herein has an advantage over the prior art that the coupling parts can run dry; lubrication with oil can be dispensed with, so there is no dependency on the supply of motor oil. Further advantages are improved running properties of the coupling and hence greater durability of the coupling elements; a lower coupling temperature because of the reduction in internal friction; improved function because there is less variation in ignition timing; less noise; and more favorable production, because the slaving device is no longer needed.

Further advantageous features of and improvements to the ignition distributor disclosed will be revealed herein after. The parts that undergo great mechanical stress, at the force transfer points of the claw coupling, are high-quality spare parts fixed in the carrier material; this has advantages in terms of both operational reliability and cost.

The invention will be better understood and further objects and advantages thereof will become more apparent from the ensuing detailed description of preferred embodiments taken in conjunction with the drawings.

BRIEF DESCRIPTION OF THE DRAWINGS

FIG. 3 shows a first coupling part according to the invention, which is connected to the distributor shaft and is of a dimensionally stable, wear-resistant plastic;

FIG. 3a is a part of FIG. 3 illustrating a delimiting part.

FIG. 4 shows a modified first coupling part having a disk-like basic body made of a filled dimensionally stable plastic, with closed chambers inside the disk that are of dimensionally stable and wear-resistant plastic;

FIG. 4a illustrates a cross-sectional view of a liner shown in FIG. 4;

FIG. 5 shows a third version of the first coupling part having a metal disk-like basic body and liners of dimensionally stable and wear-resistant plastic that form groove-like openings; and FIG. 5a illustrates a cross-sectional view of a liner shown in FIG. 5.

DESCRIPTION OF THE PREFERRED EMBODIMENTS

Figure 1:
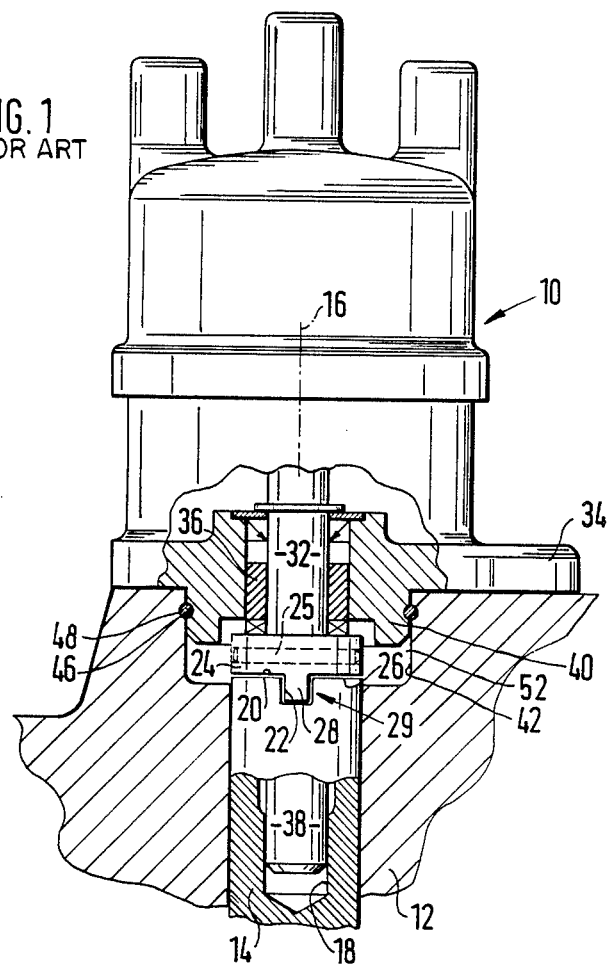
FIG. 1 is a fragmentary longitudinal section through an ignition distributor according to the prior art.

FIG. 1, which shows the prior art, is a schematic fragmentary section through an ignition distributor 10, showing its disposition on an engine block 12 of an internal combustion engine, not otherwise shown. A rotatable drive shaft 14, as the drive device, is supported in the engine block 12. On its end oriented toward the ignition distributor 10, the drive shaft 14 has a blind bore or plug-in opening 18 disposed coaxially with its axis 16; and on its face end, the drive shaft 14 forms a second coupling part 20, which has a first groove 22 that diagonally intersects the face end of the drive shaft 14. The inside of the first groove 22 is engaged by a first coupling part 24 having diagonally extending claws 28 that protrude from its end face 26. Via a connecting element 25, here in the form of a slaving pin, the first coupling part 24 is joined in a manner fixed against relative rotation with a distributor shaft 32 disposed coaxially relative to the axis 16. A bearing 36 in which the distributor shaft 32 is supported is disposed in a flange 34 of the ignition distributor 10. An end portion 38 of the distributor shaft 32 is centered in the plug-in opening 18. With a collar 40, the flange 34 engages the inside of a recess 42 of the engine block 12 that circularly surrounds the first coupling part 24. On its circumference, the collar 40 has a groove 46, in which a sealing ring 48 is placed. The part of the recess 42 not filled by the flange 34 forms a work chamber 52.

The apparatus described thus far has the following functional and operational features: The torque required to operate the ignition distributor 10 is transferred from the drive shaft 14 to the second coupling part 20 formed on it. The second coupling part 20 and the first coupling part 24, in combination with the prevention of relative rotation offered by the connecting element 25, functionally cooperate to form a claw coupling 29, so that the torque that drives the ignition distributor 10, not shown in further detail, reaches the distributor shaft 32. The claw coupling 29 is typically made of steel. This necessitates an oil-filled work chamber 52 partly surrounding the coupling and from whence the lubrication of the coupling parts of the claw coupling 29 is effected. The sealing ring 48 tightly closes off the work chamber 52 from the outside.

Figure 2:
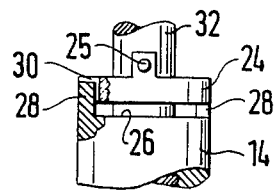
FIG. 2 is a schematic view of the disposition of the coupling between the drive shaft and the distributor shaft in a manner unlike the prior art.

In a departure from the prior art, the exemplary embodiments described below illustrate the design of the claw coupling 29, schematically shown in FIG. 2; this description will address only the basic illustration. On its end oriented toward the distributor shaft 32 or drive shaft 14, the drive shaft 14 or distributor shaft 32 itself embodies the second coupling part 20 in this modification, with the end face 26 and claws 28 protruding from it. With their shape suitably adapted and made smaller by a jointing play, these claws 28 engage the inside of axially opposed recesses 30 in the first coupling part 24, which is secured with the coupling element 25, such as a transverse pin, in a manner fixed against relative rotation on the distributor shaft 32 or drive shaft 14, where they make a form-fitting connection which enables a transfer of moment between the drive shaft 14 and the distributor shaft 32. With this as the basis, FIGS. 3–5 show the first coupling part 24 of the claw coupling 29 in greater detail, in modifications that differ from the prior art.

The first coupling part 24 shown in FIG. 3 has a basic body in the form of a disk 60, with delimiting parts 66, protruding from one face end 64 of the disk 60, that define two recesses 130 in the disk 60 in the circumferential direction. The common center line 62 of the recesses 130 is offset from the axis of the coupling part by a distance 63. The delimiting parts 66, which serve to transfer force and to lessen the pressure per unit of surface area, are cheeks of rectangular cross-section, which protrude at right angles from the disk. The length of the delimiting parts 66 from the edge to the interior of the disk depends on the depth of the recesses 130 and the width of the claws 28. As a rule, it is from $\frac{1}{4}$ to $\frac{1}{3}$ the disk radius. The face end 64 of the disk 60 has a rib 68 of about the same height as the delimiting parts 66, the center line 71 of the rib being a diameter that is vertical to the center line 62 of the recesses 130. The rib 68 is interrupted by an axial bore 69, which serves to receive the distributor shaft 32 or drive shaft 14 with play, depending on whether the second coupling part 20 is disposed on the drive shaft 14 or on the distributor shaft 32. Along its length, the rib 68 has a longitudinal bore 70 extending through its center, which is embodied as a through bore and serves to receive the slaving pin 25 by way of which the first coupling part 24 is coupled to the distributor shaft 32 or drive shaft 14.

FIG. 4 shows a modified first coupling part 124 as a basic body in the form of a disk 160, with recesses 142 located inside the circumference of the disk 160. Liners 76 that have recesses in the form of openings 230 are inserted into the recesses 142. The cross section of the openings 230 is equivalent to the cross section, enlarged by a jointing play, of the claws 28. In the exemplary embodiment shown, the openings 230 have a rectangular cross section; their common center line 62 is offset from a line through the axis parallel to it by a distance 63. The openings 230 are formed by liners 76, which have substantially constant wall thickness, except for steps 78; in the middle of the delimiting faces 74 of the liners 76 pointing in the circumferential direction, two such steps 78 in each case point away from the openings 230. The liners 76 are rigidly inserted into the disk 160. The bore 70, embodied as a through bore and located on a diameter, for receiving the slaving pin 25 extends at right angles to the center line 62, interrupted by an axial through opening 169 in the disk 160. The bore 70 is reinforced in the vicinity of its end positions with tubular hollow bodies 80 that narrow the bore 70. In the vicinity of the liners 76 and the bore 70, the disk 160 has reinforcements 82 surrounding these liners and the bore.

A third exemplary embodiment of the first coupling part 224 is shown in FIG. 5. Once again, the basic body of the first coupling part 224 is in the form of a disk 260, which has a constant thickness, with groove-like recesses 242 having a common center line 62 that extend from the edge of the disk. The center line is again offset from a line through the axis parallel to it by the distance 63. Inserted into these recesses 242 are liners 86, which have recesses in the form of openings 330 occupying a rectangular cross-sectional course. The openings 330 are encompassed, toward the disk 260, by the liners 86, which are of substantially constant wall thickness, except for the bottom or inner surface 176 facing the groove bottom 177, which is embodied thicker. The liners are form-fittingly connected to the disk 260. The bore 70 extends at right angles to the center line 62, along a diameter. Once again it is embodied as a through bore 70 interrupted by an axial bore opening 269. As in the version of FIG. 4, the bore 70 is reinforced in the vicinity of its end positions via tubular hollow bodies 80 that narrow the bore 70.

The modifications according to the invention of the first coupling parts shown in FIGS. 3–5 are intended to serve to enable the transfer of torque for operating the ignition distributor 10 even without additional lubrication, and by the embodiment of the first coupling part to attain still further functional improvements.

In the first structural variant of FIG. 3, the first coupling part 24 is entirely made of dimensionally stable and wear-resistant plastic. The delimiting parts 66 which protrudes past the face end 64 of the disk 60 assure that the surface area required to transfer the torque is enlarged to the extent needed. The bore 70 serves to receive the connecting element 25 for positionally and rotationally securing the first coupling part 24 on the distributor shaft 32 or drive shaft 14. When the ignition distributor 10 is mounted on the engine block 12, the distance 63 between the center line 61 and the diameter parallel to it lends the predetermined rotational positioning with respect to the various engine cylinders, so that the triggering of the ignition pulse intended for the various cylinders is effected by the ignition distributor 10 in the proper sequence.

In the second structural variant shown in FIG. 4, the disk 160 is made of a dimensionally stable plastic, such as fiberglass-reinforced polyamide. This plastic does not have the necessary sliding capability for use in a form-fitting coupling. This property is accordingly imparted by the liners 76, which here are of dimensionally stable and wear-resistant plastic. The liners 76 are manufactured as separate components, positioned in the manufacturing mold for the disk 160, and then spray-coated automatically in the course of the injection molding of the plastic disk 160. The steps 78 act as a form-fitting positional fixation of the liners 76 when forces are directed at the face ends of the disk 160. The bore 70 has the same function as in the first variant of FIG. 3; it is reinforced via the two tubular hollow bodies 80, to suppress wear of the bore 70 when the connecting element 25 moves in the bore 70 relative to it. The reinforcements 82 protruding form the face ends of the disk 160 and surrounding the liners 76 provide the transfer surfaces required for the transfer of torque to operate the ignition distributor.

The third variant of FIG. 5 has a disk 260, which is made of metal, and which has groove-like recesses 242 as seen from the edge of the disk; the dimensionally stable and wear-resistant plastic is inserted in the form of liners 86 into these recesses 242 at the points that undergo strain in the coupling process. The liners 86, again produced as separate components, are inserted into previously made recesses 242 of the disk 260 and permanently fixed. The permanent fixation may be effected, as in this case, by wedging. The bottom 176 of the recesses 86, which has its wall reinforced, absorbs the fixation forces directed at it. The tubular hollow bodies 80 are fixed in the bore 70, for instance by a frictional connection. The tubular hollow bodies 80 receive the connecting element 25 for the positional and rotational fixation of the first coupling part 224 on the distributor shaft 32 or drive shaft 14. The dimensionally stable and wear-resistant plastic used for the disk 60 in the first variant of FIG. 3 as well as for the liners 76 and 86 in the second and third variants of FIGS. 4 and 5, which also has these properties because it is self-lubricating and hence capable of dry running, is advantageously a polyimide.

The dimensionally stable filled basic material mentioned for the disk 60 in the second variant of FIG. 4 is advantageously a Polyamide 6 with 30% fiberglass.

The disk 260, which in the third variant of FIG. 5 is made of metal, may be manufactured from a deformable material not having a tendency to become brittle, such as aluminum.

With the further features described, it is in particular possible to dispense with the lubrication of the claw coupling 29 with oil and not have to design an encapsulated lubrication.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. An ignition distributor for internal combustion engines having a distributor shaft coupled to a drive device via a claw coupling (29), comprising a first coupling part disposed coaxially on the distributor shaft (32) and firmly mounted on the distributor shaft (32) by means of a connecting element (25), a second coupling part (20) disposed on the distributor shaft (32), further in which the claw coupling (29) includes claws (28) which are formed onto the second coupling part (20) and form-fittingly engage the inside of at least one recess (30; 130; 230; 330) in the first coupling part, and the at least one recess (30; 130; 230; 330) in the vicinity of the claw engagement comprise dimensionally stable wear-resistant plastic having self-lubricating properties.

2. An ignition distributor as defined by claim 1, in which the first coupling part comprises the dimensionally stable and wear-resistant plastic.

3. An ignition distributor as defined by claim 2, in which the first coupling part comprises a disk (60) having delimiting parts (66) located parallel to a first diameter of the disk (60) and protruding from one face end (64) of the disk (60), which parts define the recesses (130) in the circumferential direction, having a rib (68) which extends vertically to the first diameter of said disk and protrudes in the same direction as the delimiting parts (66) from the face end (64) of the disk (60), and further has a continuous longitudinal bore (70) and is interrupted in an axial through opening (69) of the disk (60).

4. An ignition distributor as defined by claim 3, in which the bore (70) receives the connecting element (25) for positional and rotational securing of the disk (60) on the distributor shaft (32).

5. An ignition distributor as defined by claim 1, in which the first coupling part is a disk (160) having recesses (142) located on a center line located parallel to a first diameter of the disk, having a bore (70) extending along a second diameter of the disk (160), wherein the center line (62) and the second diameter are at right angles to one another and the bore (7) has tubular hollow bodies (80) and the recesses (142) have a liner (76), each said hollow body (80) and liner (76) being manufactured for dimensionally stable, wear-resistant plastics; and further wherein the disk (160) is reinforced in the vicinity of the bore (70) and the liner (76).

6. An ignition distributor as defined by claim 5, in which the liners (76) have openings (230).

7. An ignition distributor as defined by claim 5, in which the disk (60) comprises fiberglass-reinforced Polyamide 6.

8. An ignition distributor as defined by claim 6, in which the disk (60) comprises fiberglass-reinforced Polyamide 6.

9. An ignition distributor as defined by claim 1, in which the first coupling part is a disk (260) of metal including recesses (242) which are lined with dimensionally stable and wear-resistant plastic.

10. An ignition distributor as defined by claim 8, in which the disk (260) has two groove-like recesses (242), located on a center line (62) parallel to said first diameter of the disk (260), and a bore (70) extending along said second diameter, further wherein the center line (62) and the second diameter are at right angles to one another, and liners (86) that have openings (330) are inserted into recesses (242) of the disk (260).

11. An ignition distributor as defined by claim 8, in which said disk (260) is formed of aluminum.

12. An ignition distributor as defined by claim 9, in which said disk (260) is formed of aluminum.

13. An ignition distributor as defined by claim 1, in which the dimensionally stable, wear-resistant plastic is a polyimide.

14. An ignition distributor as defined by claim 2, in which the dimensionally stable, wear-resistant plastic is a polyimide.

15. An ignition distributor as defined by claim 3, in which the dimensionally stable, wear-resistant plastic is a polyimide.

16. An ignition distributor as defined by claim 4, in which the dimensionally stable, wear-resistant plastic is a polyimide.

17. An ignition distributor as defined by claim 5, in which the dimensionally stable, wear-resistant plastic is a polyimide.

18. An ignition distributor as defined by claim 9, in which the dimensionally stable, wear-resistant plastic is a polyimide.

19. An ignition distributor as defined by claim 10, in which the dimensionally stable, wear-resistant plastic is a polyimide.

20. An ignition distributor as defined by claim 11, in which the dimensionally stable, wear-resistant plastic is a polyimide.

* * * * *